United States Patent
Wong

(10) Patent No.: US 11,747,576 B2
(45) Date of Patent: Sep. 5, 2023

(54) CLIP FOR HOLDING FIBER OPTIC CONNECTORS

(71) Applicant: Senko Advanced Components, Inc., Marlborough, MA (US)

(72) Inventor: Kim Man Wong, Kowloon (HK)

(73) Assignee: Senko Advanced Components, Inc, Hudson, MA (US)

( * ) Notice: Subject to any disclaimer, the term of this patent is extended or adjusted under 35 U.S.C. 154(b) by 0 days.

(21) Appl. No.: 17/563,312

(22) Filed: Dec. 28, 2021

(65) Prior Publication Data

US 2022/0214504 A1 Jul. 7, 2022

Related U.S. Application Data

(60) Provisional application No. 63/249,240, filed on Sep. 28, 2021, provisional application No. 63/131,598, filed on Dec. 29, 2020.

(51) Int. Cl.
*G02B 6/38* (2006.01)
*G02B 6/36* (2006.01)

(52) U.S. Cl.
CPC .......... *G02B 6/3879* (2013.01); *G02B 6/3616* (2013.01)

(58) Field of Classification Search
CPC .................................................. G02B 6/3879
See application file for complete search history.

(56) References Cited

U.S. PATENT DOCUMENTS

| | | | | |
|---|---|---|---|---|
| 4,759,600 A * | 7/1988 | Caron | ................... | G02B 6/3897 385/75 |
| 4,953,929 A * | 9/1990 | Basista | ................ | G02B 6/3879 385/55 |
| 5,076,656 A * | 12/1991 | Briggs | ................. | G02B 6/3878 385/71 |
| 5,123,071 A * | 6/1992 | Mulholland | ......... | G02B 6/3831 385/56 |
| 5,293,581 A * | 3/1994 | DiMarco | .............. | G02B 6/3879 385/76 |
| 5,325,454 A * | 6/1994 | Rittle | .................... | G02B 6/4292 385/76 |
| 5,343,547 A * | 8/1994 | Palecek | ................ | G02B 6/3879 385/76 |
| 5,386,487 A * | 1/1995 | Briggs | ................. | G02B 6/3879 385/59 |
| 5,675,682 A * | 10/1997 | De Marchi | ......... | H01R 13/6275 385/139 |
| 6,212,324 B1 * | 4/2001 | Lin | ....................... | G02B 6/3879 385/136 |
| 6,592,266 B1 * | 7/2003 | Hankins | ............... | G02B 6/3879 385/53 |

(Continued)

*Primary Examiner* — Michael Stahl

(57) ABSTRACT

The clip for securing two fiber optic connectors may include a first engagement member having a top surface and a length; a second engagement member spaced apart from the first engagement member; and a linkage member extending between the first and second engagement members and connecting the first engagement member and the second engagement member. A space is defined between the first and second engagement members to house the connectors. The linkage member is configured to separate the two fiber optic connectors when they are sandwiched between the first and second engagement members.

14 Claims, 9 Drawing Sheets

(56) References Cited

U.S. PATENT DOCUMENTS

| | | | | |
|---|---|---|---|---|
| 7,128,470 B2* | 10/2006 | Scherer | ............... | G02B 6/3873 |
| | | | | 385/71 |
| 2003/0091295 A1* | 5/2003 | Cheng | ................. | G02B 6/3807 |
| | | | | 385/76 |
| 2006/0089049 A1* | 4/2006 | Sedor | ................. | G02B 6/3879 |
| | | | | 439/620.21 |
| 2007/0047877 A1* | 3/2007 | Pepe | ................... | G02B 6/3879 |
| | | | | 385/59 |
| 2008/0050070 A1* | 2/2008 | Gurreri | ............... | G02B 6/3891 |
| | | | | 385/55 |
| 2011/0081113 A1* | 4/2011 | Jones | ................... | G02B 6/3879 |
| | | | | 385/62 |
| 2017/0227718 A1* | 8/2017 | Akieda | ............... | G02B 6/3825 |
| 2020/0271871 A1* | 8/2020 | Bragg | .................. | G02B 6/3888 |
| 2020/0393624 A1* | 12/2020 | Dubey | ................. | G02B 6/362 |

* cited by examiner

CLIP FOR HOLDING FIBER OPTIC CONNECTORS

CROSS-REFERENCE TO RELATED APPLICATION

The present invention claims priority to U.S. Provisional Patent Application No. 63/131,598 filed on Dec. 29, 2020 entitled "Fiber Optic Connector with Removable Clip", and claims priority to U.S. Provisional Patent Application No. 63/249,240 filed on Sep. 28, 2021 entitled "Clip", the disclosures of which are incorporated hereby by reference in their entireties.

FIELD OF THE INVENTION

The present invention generally relates to clip configured to secure a pair of fiber optic connectors to be inserted into the receptacle and withdrawn from the receptacle together.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connects, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

As the size of the connector becomes smaller, its operability may be impacted. To accommodate more connectors within the same space makes the connection difficult and time consuming. Therefore, it is appreciated by those skilled in the art to have more connectors inserted or removed from the receptacle at the same time.

SUMMARY

In one aspect of the present invention, the clip for securing at least two fiber optic connectors may include a first engagement member having a top surface and a length; a second engagement member spaced apart from the first engagement member; and a linkage member extending between the first and second engagement members and connecting the first engagement member and the second engagement member. A space is defined between the first and second engagement members to house the connectors. The linkage member is configured to separate the at least two fiber optic connectors when the connectors are sandwiched between the first and second engagement members.

The clip according to the present disclosure may further include a handle that extends upwards or in the length direction.

BRIEF DESCRIPTION OF THE DRAWINGS

The present disclosure will become more fully understood from the detailed description given hereinbelow and the accompanying drawings, which are given by illustration only, and thus are not limitative of the present disclosure, and wherein.

DETAILED DESCRIPTION

This disclosure is not limited to any particular system, device and method described, as these may vary. The terminology used in the description is for the purpose of describing the versions or embodiments only and is not intended to limit the scope.

The following terms shall have, for the purposes of this application, the respective meanings set forth below. A connector, as used herein, refers to a device and/or components thereof that connects a first module or cable to a second module or cable. The connector may be configured for fiber optic transmission or electrical signal transmission. A fiber optic connector or connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, an MPO connector, a CS connector, or a straight tip (ST) connector. The connector may generally be defined by a connector housing body. In some embodiments, the housing body may incorporate any or all the components described herein.

Figure 1A:
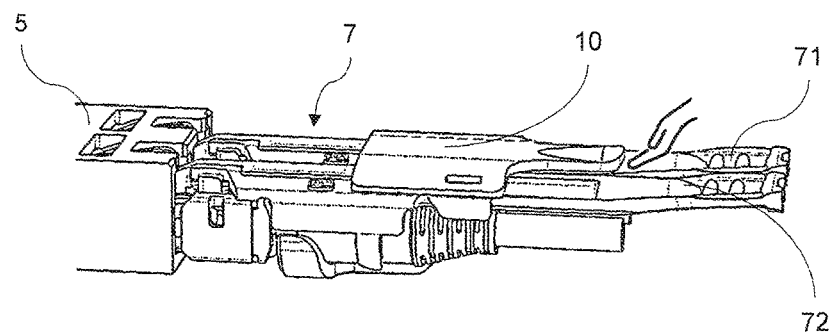
FIGS. 1A and 1B are perspective views of a pair of fiber optic connectors plugged into a receptacle.

FIG. 1A depicts a pair of fiber optic connectors 7 inserted into a receptacle 5. The pair of fiber optic connectors 7 include fiber optic connectors 71, 72 which are held by a clip 10 to move together as a group. The fiber optic connectors 71 and 72 are identical connectors. The clip 10 is configured to secure the fiber optic connectors 71, 72 to allow the user to manipulate both fiber optic connectors 71, 72 at the same time. By using the clip 10, the connectors 71, 72 are inserted into the receptacle 5 together.

Figure 1B:
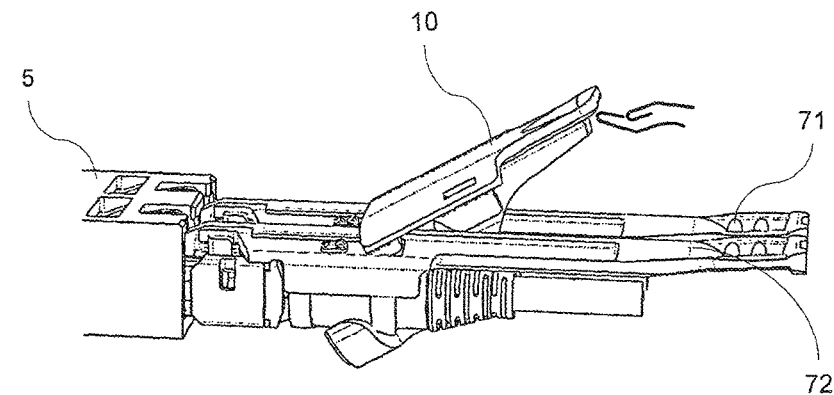

To remove the clip 10, as shown in FIG. 1B, the user may simply lift the clip 10 and remove the clip 10 from the connectors 71, 72 without interference with the connection of the connectors and the receptacle.

Figure 2A:
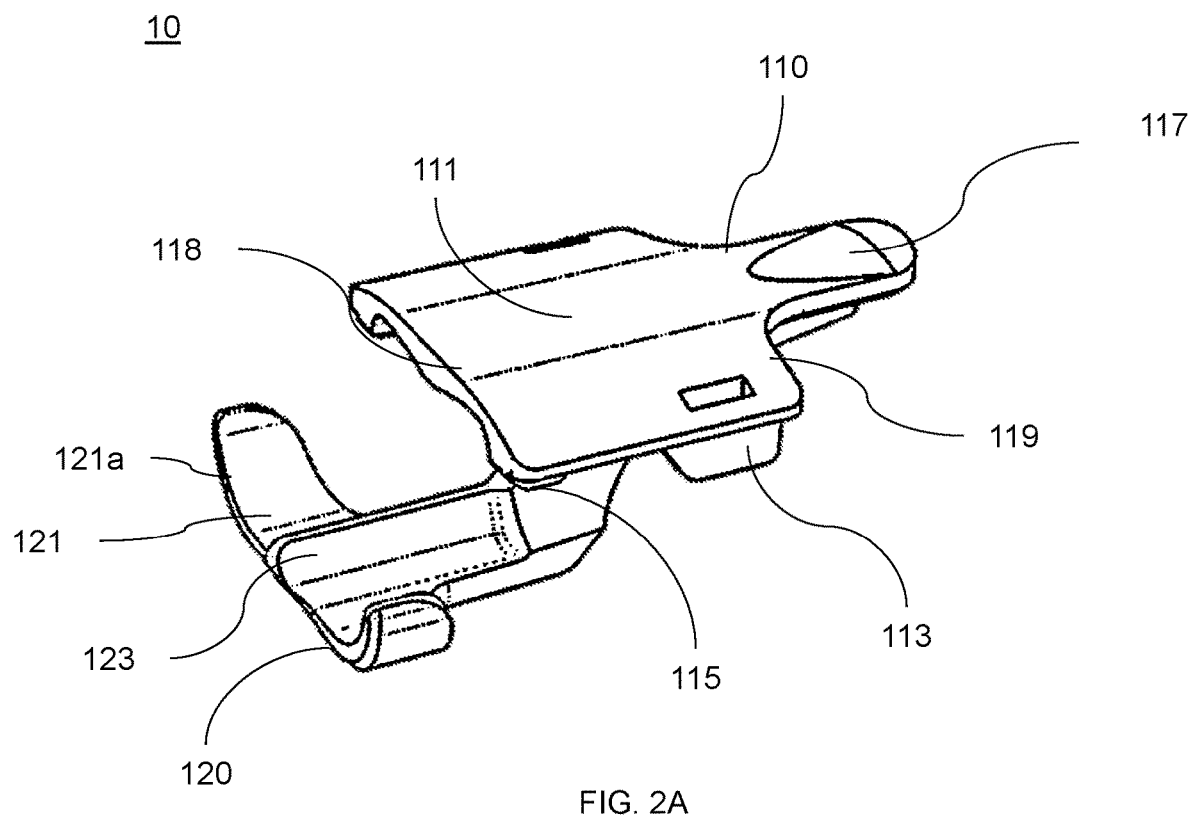
FIGS. 2A and 2B are perspective views of a clip in accordance with one embodiment of the present disclosure.
Figure 2B:
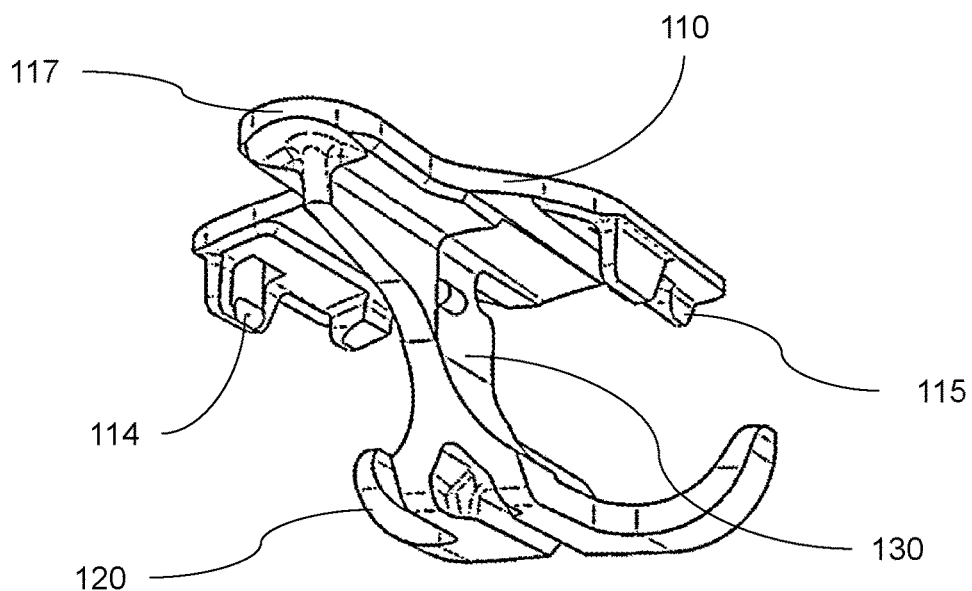

Now referring to FIGS. 2A and 2B, the clip 10 may include a first engagement member 110, a second engagement member 120, and linkage member 130. The first engagement member 110 and second engagement member 120 extend in a length direction and are spaced apart from each other in a vertical direction perpendicular to the length direction. The first engagement member 110 includes a front end 118 and an opposing rear end 119 in the length direction. In the description, the front end is the proximate end to the receptacle when the connectors secured by the clip are inserted into the receptacle. The linkage member 130 is configured to extend between the first engagement member 110 and second engagement member 120 and connect them. The first engagement member 110 and second engagement member 120 may offset a distance in the length direction. In this example, the linkage member 130 may obliquely extend between the first engagement member 110 and second engagement member 120.

Figure 8:
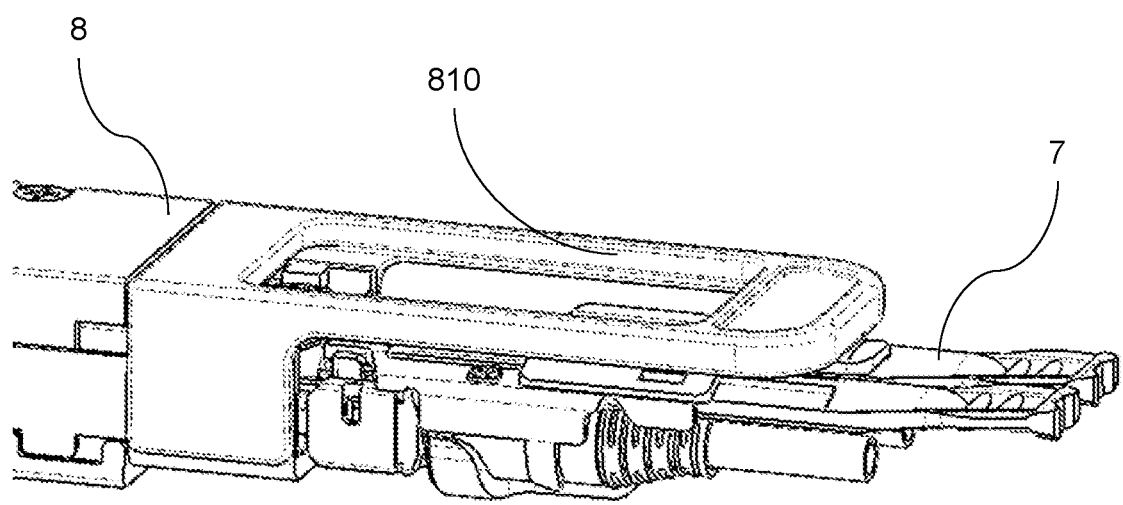
FIG. 8 is a perspective view of a pair of fiber optic connectors plugged into a transceiver.

The first engagement member 110 includes a top surface 111 which is substantially flat to avoid the interference with the handle 810 of the transceiver 8 (as shown in FIG. 8). The first engagement member 110 also includes two arms 113 adjacent to the rear end 119, extending downwards from the top surface 111. Each arm 113 is provided on the lateral side of the first engagement member 110 and configured to clamp the connector 71 or 72. In detail, each arm 113 include a protrusion 114 that snaps to the respective connector. The protrusion 114 is configured to form a tight fit between the clip and the connectors to prevent the detachment of the connectors from the clip.

To prevent the connectors' movement in the length direction, the first engagement member 110 includes two catches 115 adjacent to the front end 118. Each catch 115 is configured to cooperate with the connector to secure the connector and prevent the detachment of connector from the clip.

Figure 7:
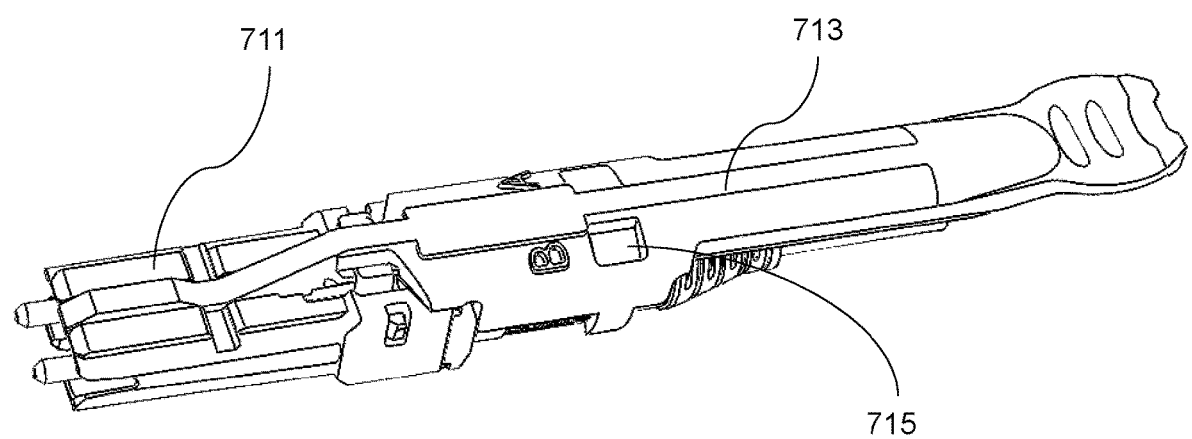
FIG. 7 is a perspective view of a fiber optic connector.

As shown in FIG. 7, the fiber optic connector 71 may include a connector body 711 and a push pull tab 713. The fiber optic connector 71 or 72 is a CS connector and its detailed description will be omitted to make a concise description. The connector body 711 may include at least two ferrules, e.g., LC type ferrules. The push pull tab 713 includes two sockets 715 to receive the catches 115 of the clip 10. Each socket 715 may include a ramp to facilitate the catch 115 move in and out of the socket 715.

Returning back to FIGS. 2A and 2B, the second engagement member 120 includes an accommodation portion 121 which is configured to accommodate at least part of the peripheral of the fiber optic connectors 7. The accommodation portion 121 may include two wings 121a divided by a raised portion 123. Each wing 121a is configured to embrace a respective fiber optical connector 71 or 72 and shaped to have a curve surface. The curve surface is sized and configured to conform to the shape of the peripheral surface of the connector, e.g., the shape of connector boot. The raised portion 123 may extend in the length direction and connect with the linkage member 130 to separate the two fiber optic connectors 71, 72 to ensure the alignment of each connector with the corresponding channel of the receptacle 5.

The linkage member 130 is arranged between the first engagement member 110 and second engagement member 120, and may extend in a direction that deviates from the vertical direction. The linkage member 130 is configured to have a height such that a space defined between the first engagement member 110 and second engagement member 120 is sufficient to house at least part of the pair of fiber optic connectors 7 such that the connectors 7 are sandwiched between the first and second engagement members 110, 120.

The first engagement member 110 is also provided with a handle 117 at the rear end 119 to ease the grip of the clip 10. In this example, the handle 117 extends a certain distance in the length direction. The handle 117 may be formed of other configurations, which will be explained below.

When removing the clip 10, the user may first grasp the handle 117 to lift the clip and disengage the catches 115 from the respective connectors. Then, the clip 10 may be removed from the connectors while the connectors are plugged into the receptacle.

Figure 3:
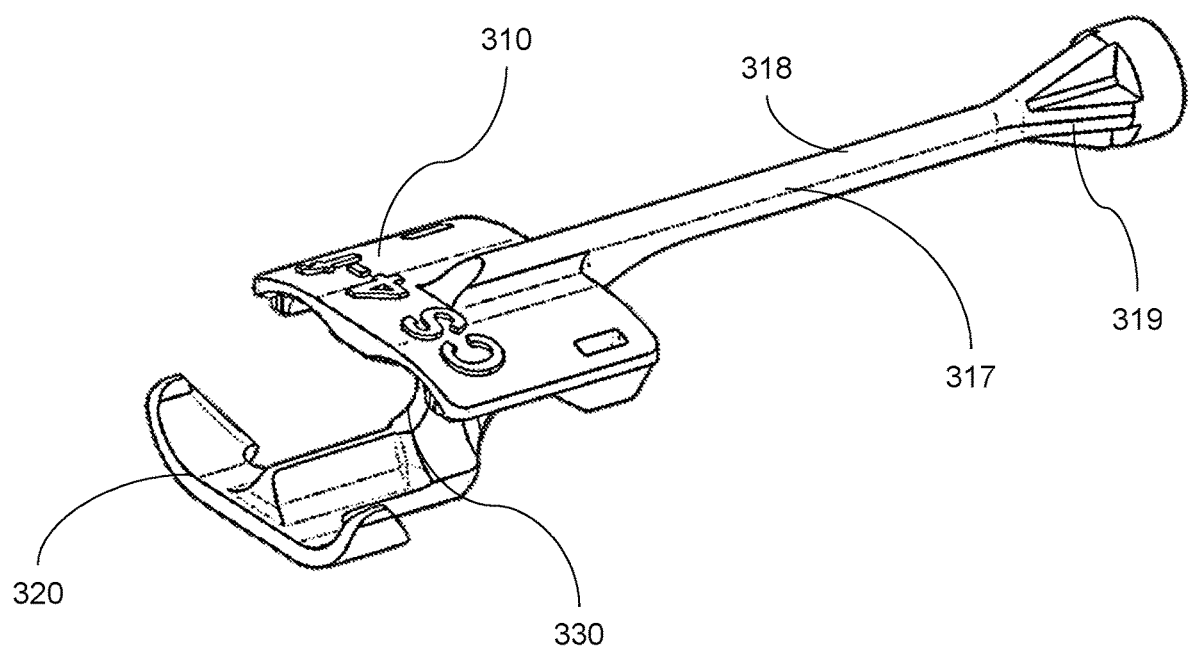
FIG. 3 is a perspective view of the clip with an alternative handle.

In FIG. 3, the clip 30 has a similar structure of clip 10 shown in FIGS. 1A and 1B. in detail, the clip 30 includes a first engagement member 310, second engagement member 320 and a linkage member 330 connecting them. The clip 30 also includes a handle 317. The handle 317 may include an elongated body 318 extending in the length direction and a grip 319 at the end of the body 318. The elongated handle 317 may facilitate the use of the clip 30 and insertion and removal of the fiber optic connectors 7.

Figure 4A:
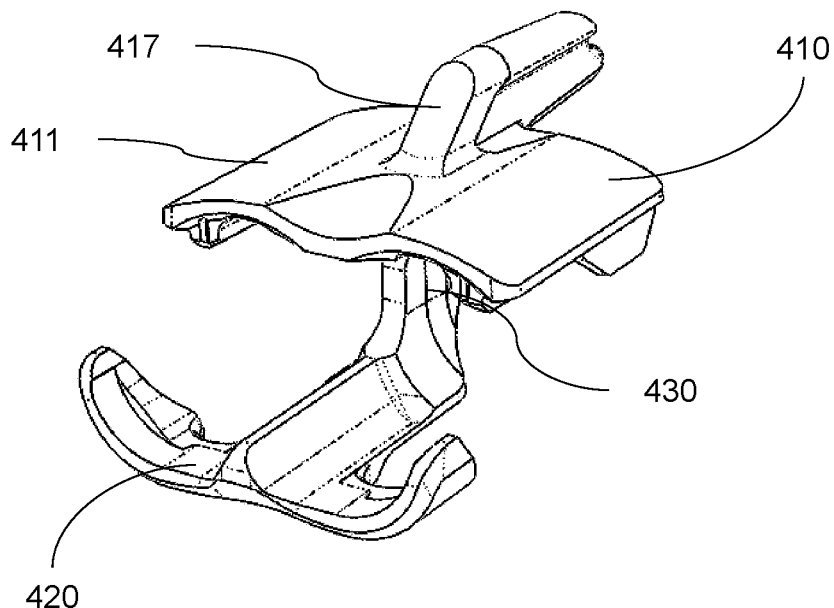
FIGS. 4A and 4B are perspective views of the clip with another alternative handle.
Figure 4B:
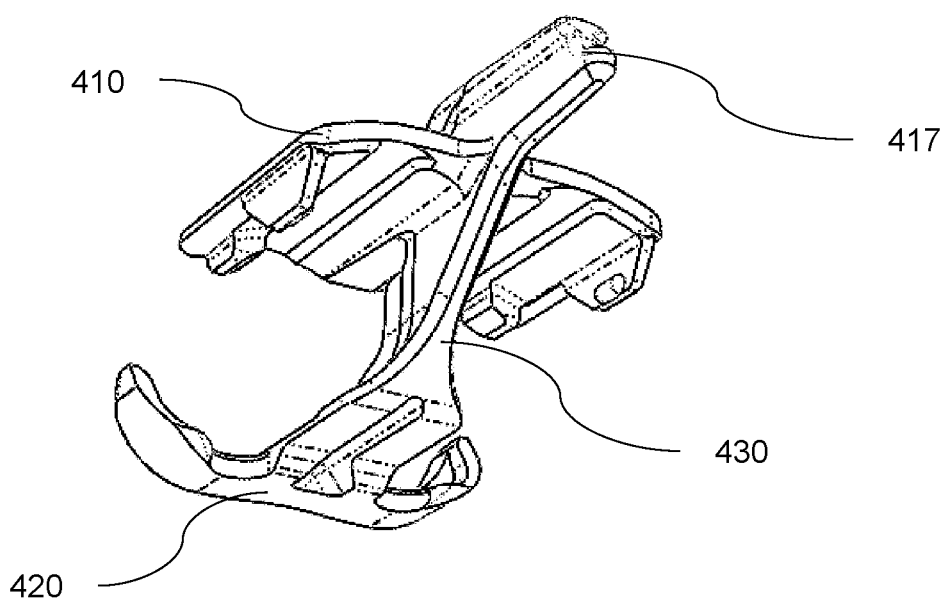

In FIGS. 4A and 4B, the clip 40 has a similar structure of the clip 10 in FIGS. 1A and 1B, and includes the first engagement member 410, second engagement member 420 and linkage member 430. The clip 40 also includes a clip 417 extending in the length direction. To ease the grip of the clip, the clip 417 further extends upwards from the top surface 411 and have a certain height.

Figure 5A:
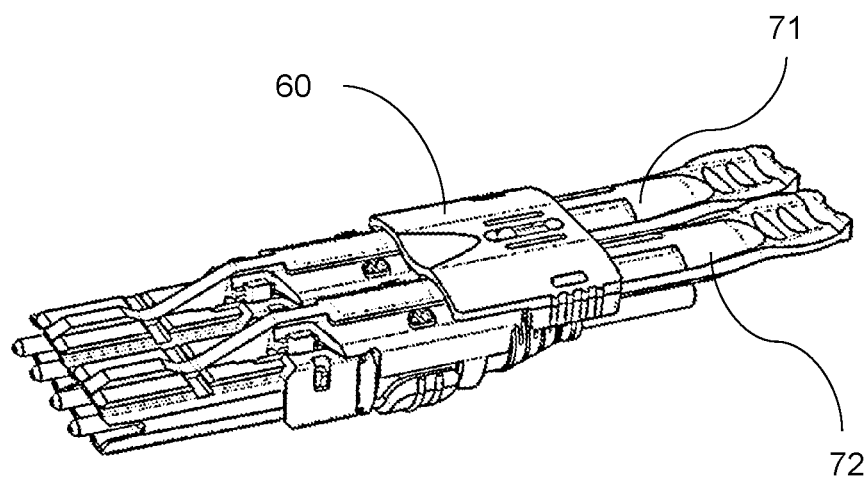
FIGS. 5A and 5B are perspective views of the pair of fiber optic connectors secured by the clip in accordance with another embodiment of the present disclosure.
Figure 5B:
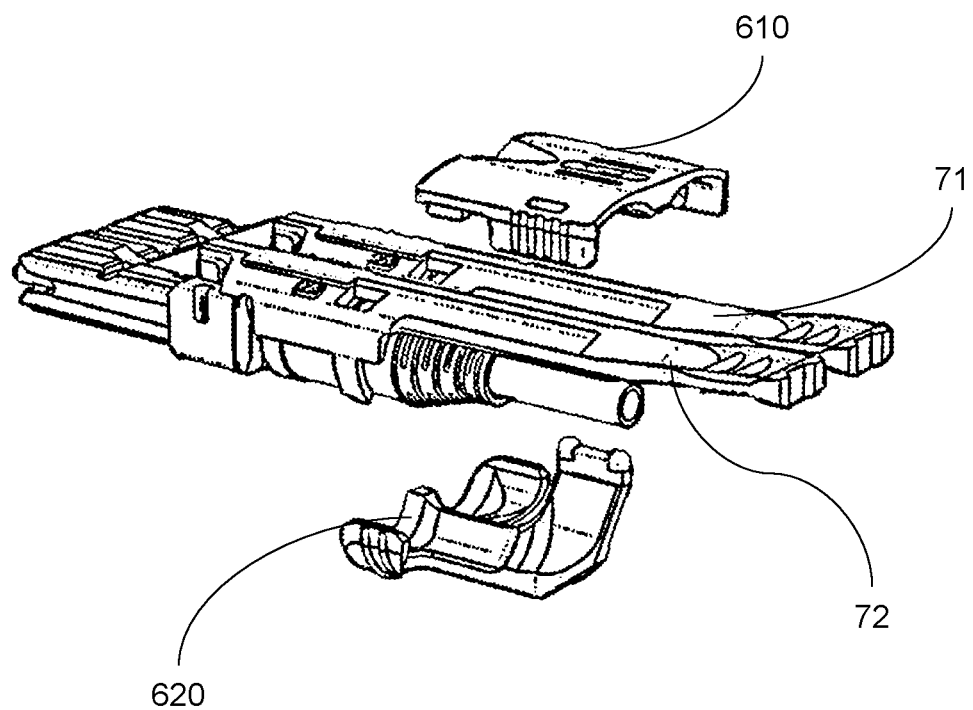

The clip may be formed as an integral part, for example, first engagement member, second engagement member and the linkage member may be integrated as a unit, or the first engagement member or the second engagement member may be removable connected to the remainder parts of the clip. As shown in FIG. 5A, the two fiber optic connectors 71, 72 are held by the clip 60. In FIG. 5B, the clip 60 includes first engagement member 610 and second engagement member 620. the first engagement 610 and second engagement member 620 are attached to the side-by-side fiber optic connectors 71, 72 from different orientations, i.e., from top and bottom, respectively.

Figure 6A:
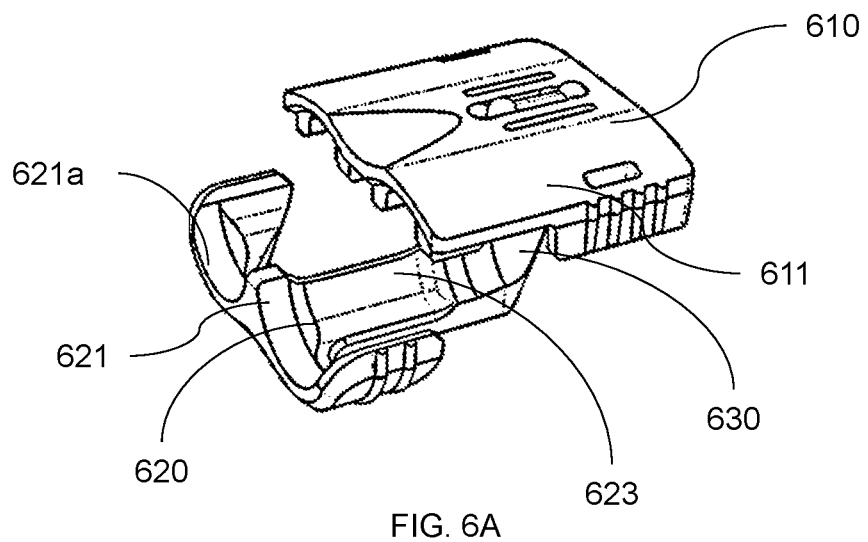
FIG. 6A is a perspective view of the clip of FIGS. 5A and 5B.
Figure 6B:
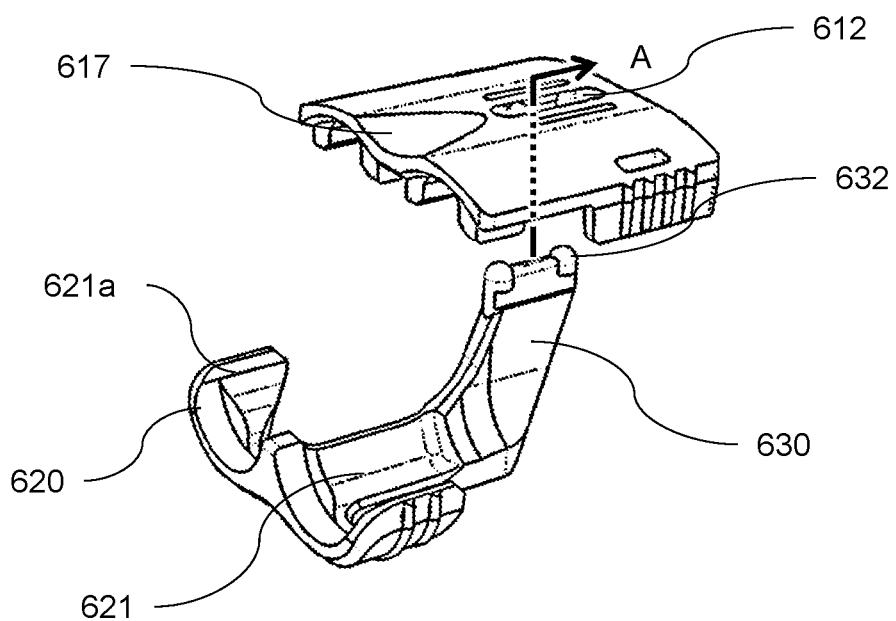
FIG. 6B is an exploded view of the clip.

As shown in FIG. 6A, the clip 60 includes the linkage member 630 connecting the first engagement member 610 and second engagement member 620. The first engagement member 610 is removably attached to the linkage member 630, as shown in FIG. 6B. The first engagement member 610 and second engagement member 620 are arranged to be offset a certain distance in the length direction. The first engagement member 610 also includes a top surface 611 which is substantially flat. The top surface 611 is provided with a slot 612 in the middle, which extends a distance L1 in the length direction. The slot 612 also includes a front end and rear end and has a width. The first engagement member 610 also includes a handle 617 to ease the grip of the clip 60.

The second engagement member 620 includes the accommodation portion 621 which may include two wings 621*a* divided by the raised portion 623. Each wing 621*a* is configured to have a curve surface conforming to the peripheral surface of the connector to embrace the connector. The raised portion 623 may extend in the length direction and connect to the linkage member 630 to separate the two fiber optic connectors 71, 72 to ensure the alignment of the connector with the corresponding channel within the receptacle.

Figure 6C:
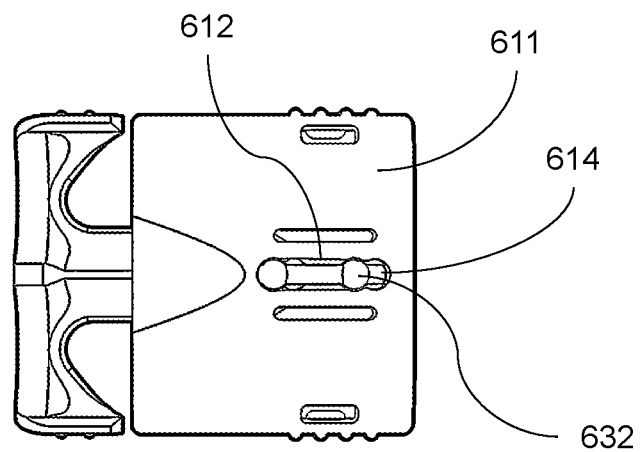
FIGS. 6C and 6D are top views of the clip.
Figure 6D:
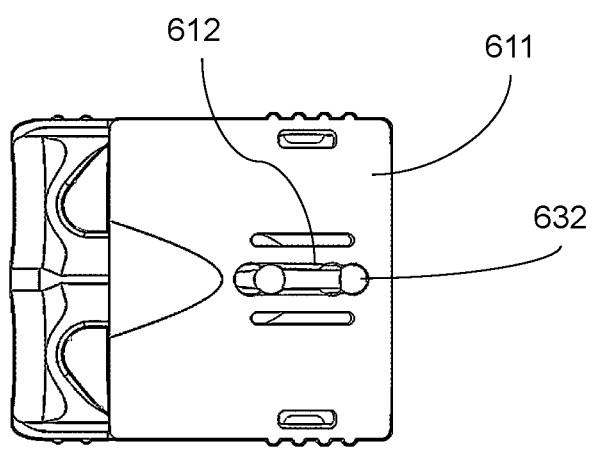

The connection of the first engagement member 610 and the linkage member 630 is shown in FIGS. 6B-6D. The linkage member 630 includes a top which is provided with two joints 632, i.e., a front and rear joint. The two joints 632 may extend upwards from the top and space apart from each other a distance L2. The distance L2 is configured to be smaller than the distance L1, such that the joints 632 may move back and forth within the slot 612 when receive within the slot 612. Each joint 632 may have a dimension that is slightly larger than the width of the slot 612. The slot 612 may be slightly deformed to receive the joints 632 when attaching the first engagement member 610 to the linkage member 630. In FIG. 6C, the joints 632 are received in the slot 612 where the front joint 632 resides at the front end of the slot 612. In this example, each joint 632 may have a round shape or have a similar spherical shape. However, those skilled in the art shall understand that the joint may have other smooth shape to facilitate the entry into the slot. The slot 612 may further include a retention position 614 provided at its rear end. The right joint 632 then moves in a direction A as shown in FIG. 6A to the rear end of the slot 512, it resides in the retention position 614 which may restrict its return movement, as shown in FIG. 6D. To detach the first engagement member 610 and the linkage member 630, the user may move the linkage member 630 in the opposite direction of direction A and lift the first engagement 610 to separate the joints 632 from the slot 612.

Those skilled in the art may understand that the receptacle shall include both adapter and transceiver. The adapter or transceiver may include one or more channels. For example, the adapter may include two channels or four channels. The clip according to the present disclosure may be used with different types of connectors. For example, the clip is compatible with connector including LC or MT ferrules.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera).

The invention claimed is:

1. A clip for holding at least two fiber optic connectors, the clip comprising:
    a first engagement member having a top surface and extending a distance in a length direction;
    a second engagement member spaced apart from the first engagement member; and
    a linkage member extending between the first and second engagement members in one direction and connecting the first engagement member and the second engagement member, such that a space is defined between the first and second engagement members to house at least part of the connectors, and wherein the linkage member is configured to separate the connectors when the connectors are held between the first and second engagement members,
    wherein the connectors are held in a side-by-side manner between the first and second engagement members to enable the connectors to move together,
    wherein the clip is free of side wall, and
    wherein the second engagement member includes a holding portion configured to have at least one curve portion.

2. The clip as set forth in claim 1, wherein the first engagement member includes at least one arm on a lateral side to clamp to the fiber optic connectors.

3. The clip as set forth in claim 1, wherein the first engagement member includes a handle extending upward or in the length direction.

4. The clip as set forth in claim 1, wherein the first engagement member includes at least one catch to restrict the movement of the connectors.

5. The clip as set forth in claim 1, wherein the holding portion is configured to conform to the shape of one of the fiber optic connectors.

6. The clip as set forth in claim 1, wherein the first engagement member and second engagement member are arranged to offset from each other along the length direction.

7. The clip as set forth in claim 1, wherein the first engagement member includes a substantially flat top surface.

8. The clip as set forth in claim 1, wherein at least one of the first engagement member and second engagement member is removably connected to the linkage member.

9. The clip as set forth in claim 8, wherein the at least one of the first engagement member and second engagement member includes a slot.

10. The clip as set forth in claim 9, wherein the linkage member includes at least one joint configured to be received within the slot.

11. The clip as set forth in claim 10, wherein the at least one joint is configured to move within the slot.

12. The clip as set forth in claim 1, wherein the first engagement member, the second engagement member and the linkage member are integrated as a one-piece unit.

13. A clip for holding at least two fiber optic connectors, the clip comprising:
    a first engagement member having a top surface and extending a distance in a length direction;
    a second engagement member spaced apart from the first engagement member; and
    a linkage member extending between the first and second engagement members in one direction and connecting the first engagement member and the second engagement member, such that a space is defined between the first and second engagement members to house at least part of the connectors, and wherein the linkage member is configured to separate the connectors when the connectors are held between the first and second engagement members,
    wherein the connectors are held in a side-by-side manner between the first and second engagement members to enable the connectors to move together,
    wherein the clip is free of side wall, and
    wherein the first engagement member and second engagement member are arranged to offset from each other along the length direction.

14. A clip for holding at least two fiber optic connectors, the clip comprising:
    a first engagement member having a top surface and extending a distance in a length direction;
    a second engagement member spaced apart from the first engagement member; and
    a linkage member extending between the first and second engagement members in one direction and connecting the first engagement member and the second engagement member, such that a space is defined between the first and second engagement members to house at least part of the connectors, and wherein the linkage member is configured to separate the connectors when the connectors are held between the first and second engagement members,
    wherein the connectors are held in a side-by-side manner between the first and second engagement members to enable the connectors to move together,
    wherein the clip is free of side wall, and
    wherein at least one of the first engagement member and second engagement member is removably connected to the linkage member.

* * * * *